(12) United States Patent
Yang et al.

(10) Patent No.: US 8,885,965 B2
(45) Date of Patent: Nov. 11, 2014

(54) IMAGE DENOISING METHOD (75) Inventors: Shu Sian Yang, Hsin-Chu (TW); Wen Han Yao, Hsin-Chu (TW); Chuan Hsin Lee, Hsin-Chu (TW)

(73) Assignee: PixArt Imaging Inc, Hsin-Chu County (TW)

(*) Notice: Subject to any disclaimer, the term of this patent is extended or adjusted under 35 U.S.C. 154(b) by 292 days.

(21) Appl. No.: 12/829,424

(22) Filed: Jul. 2, 2010

(65) Prior Publication Data

US 2011/0069902 A1 Mar. 24, 2011

(30) Foreign Application Priority Data

Sep. 21, 2009 (TW) ............... 098131741 A (51) Int. Cl.
*G06K 9/40* (2006.01)
*G06T 5/00* (2006.01)
*G06T 5/20* (2006.01)

(52) U.S. Cl.
CPC ....... *G06T 5/002* (2013.01); *G06T 2207/20021* (2013.01); *G06T 5/20* (2013.01); *G06T 2207/20012* (2013.01)
USPC ............ 382/260; 382/264; 382/266; 382/275

(58) Field of Classification Search
None
See application file for complete search history.

(56) References Cited

U.S. PATENT DOCUMENTS

| | | | |
|---|---|---|---|
| 6,195,467 B1 * | 2/2001 | Asimopoulos et al. ....... | 382/261 |
| 6,633,683 B1 * | 10/2003 | Dinh et al. ................... | 382/260 |
| 8,073,277 B2 * | 12/2011 | Huan et al. ................... | 382/254 |
| 8,428,384 B2 * | 4/2013 | Bae et al. ...................... | 382/254 |
| 8,437,567 B2 * | 5/2013 | Jeong et al. .................... | 382/254 |
| 8,594,456 B2 * | 11/2013 | Yang et al. .................... | 382/275 |
| 2005/0259886 A1 * | 11/2005 | Shan .............................. | 382/260 |
| 2008/0151101 A1 * | 6/2008 | Tian et al. ..................... | 348/448 |
| 2008/0212889 A1 * | 9/2008 | Chen et al. .................... | 382/260 |
| 2008/0317375 A1 * | 12/2008 | Huan et al. .................... | 382/274 |
| 2011/0069904 A1 * | 3/2011 | Yang et al. .................... | 382/275 |

OTHER PUBLICATIONS

Buades, Antoni et al. "A non-local algorithm for image denoising" CVPR2005.
Azzabou, Noura et al. "Image denoising based on adapted dictionary computation" ICIP2007.

* cited by examiner

*Primary Examiner* — Andrae S Allison
(74) *Attorney, Agent, or Firm* — Lowe Hauptman & Ham, LLP (57) ABSTRACT

An image denoising method includes the steps of: sequentially selecting a pixel in an image as a current pixel; dynamically determining a current search block and a strength parameter; pre-denoising the comparison block of each pixel in the current search block; comparing the comparison block of the pre-denoised neighborhood pixel and the comparison block of the pre-denoised current pixel to obtain a similarity between each neighborhood pixel and the current pixel in the current search block; determining a weighting of each neighborhood pixel related to the current pixel according to the strength parameter, and a distance and the similarity between each neighborhood pixel and the current pixel in the current search block; and weighted averaging each neighborhood pixel and the current pixel in the current search block according to the weighting to obtain a reconstruction value of the current pixel.

10 Claims, 9 Drawing Sheets

IMAGE DENOISING METHOD

CROSS REFERENCE TO RELATED APPLICATION

This application claims the priority benefit of Taiwan Patent Application Serial Number 098131741 filed Sep. 21, 2009, the full disclosure of which is incorporated herein by reference.

BACKGROUND OF THE INVENTION

1. Field of the Invention

The present invention relates to an image processing method, and more particularly, to an image denoising method.

2. Description of the Related Art

Image noise is one of critical issues to the quality of an image. However, when the pixel number of an image sensor is increased, the size of a pixel is gradually reduced under the consideration of cost. This causes the noise in the images captured by the image sensor to be amplified inevitably. Therefore, the performance of denoising will gradually be a critical factor in determining the quality of an image.

Figure 1:
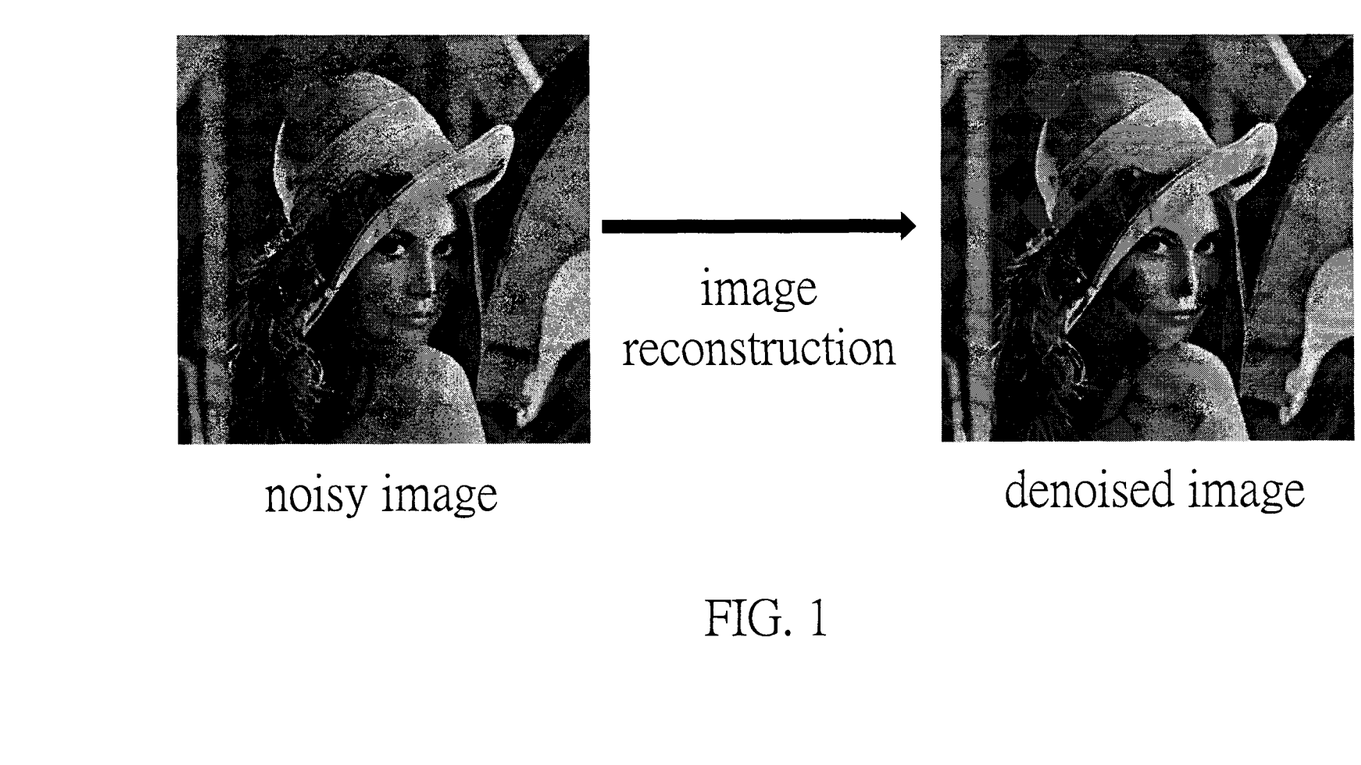
FIG. 1 illustrates a noisy image and a denoised image reconstructed from the noisy image

The method of reconstructing a noisy image to be a denoised image by a filter is named as image reconstruction. FIG. 1 illustrates a noisy image and a denoised image reconstructed from the noisy image. It will be understood that the image reconstruction can be carried out through a processing unit. In general, the processing unit is coupled to a storing unit, which is configured to temporarily store the information arisen in the course of image reconstruction.

Figure 2:
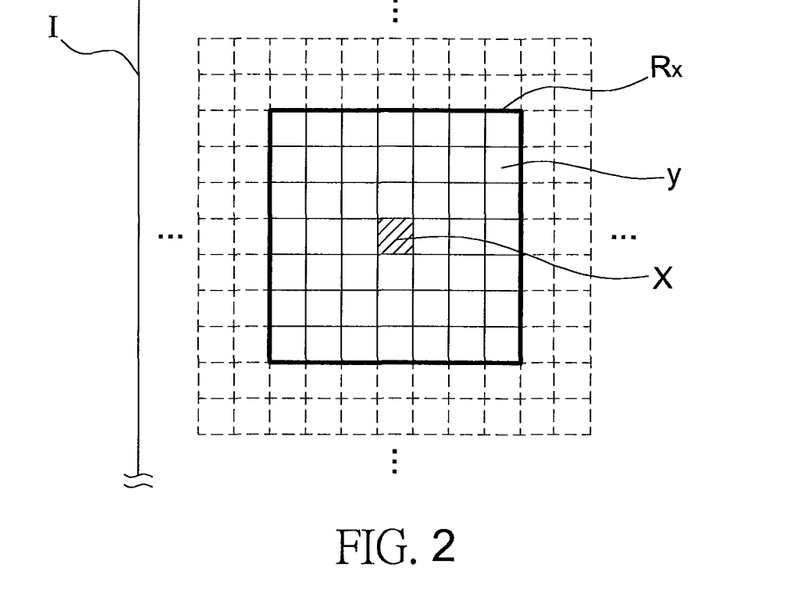
FIG. 2 is a schematic view of a conventional neighborhood filtering.

Using a neighborhood filter to carry out the image reconstruction is one of the standard techniques. The neighborhood filter determines a weighting according to a similarity between a current pixel and the neighborhood pixels thereof. Afterward, a reconstruction value of the current pixel is obtained by weighted averaging the current pixel and the neighborhood pixels according to the weighting. When all pixels in the noisy image are subjected to the above image reconstruction, a denoised image is obtained. Such a neighborhood filter can be expressed as:

$$\hat{U}(x) = \frac{1}{N_h(x)} \int\int_{R_x} h(x, y) U(y) dy \qquad (1)$$

where U is the noisy image, $N_h(x)$ is the normalization constant, $\hat{U}$ is the reconstructed image and $R_x$ is a local neighborhood associated to x. The filtering function h is a monotonically decreasing and depends on the photometric distance between the pixel x and its neighborhood pixel y, for example, on the distance and intensity difference between the current pixel x and the neighborhood pixel y. Referring to FIG. 2, it illustrates a 7×7 neighborhood filtering. An image sensor captures an image I, which is a noisy image. A neighborhood filter will obtain forty-eight (48) weightings according to similarities between a current pixel x and its 48 neighborhood pixels y within the search block $R_x$ around the current pixel x. Afterward, the reconstruction value of the current pixel x is obtained by weighted averaging the gray level of the current pixel x and the gray levels of the 48 neighborhood pixels y according to the weightings. However, the above reconstruction value is obtained by the neighborhood filter according to only the weighted average of the similarities between the pixels. The reconstruction result is always unsatisfactory.

Therefore, a so-called non-local algorithm is submitted to improve the above image reconstruction method. The non-local algorithm is first to determine a weighting according to the similarity between a predetermined-sized current pixel comparison block around a current pixel and a predetermined-sized neighborhood pixel comparison block around one of its neighborhood pixels. The non-local algorithm then obtains the reconstruction value of the current pixel by weighted averaging the gray level of the current pixel and the gray levels of the neighborhood pixels according the weighting. Such non-local algorithm can be expressed as:

$$NL[v](i) = \sum_{j \in Rx} \omega(i, j) v(j) \qquad (2)$$

where NL[v](i) is the reconstruction value of a current pixel i, v(j) is the gray level of one of its neighborhood pixels j before denoised, ω(i,j) is a weighting of the current pixel i and neighborhood pixel j, which determines the similarity between the predetermined-sized current pixel comparison block around the current pixel i and the predetermined-sized neighborhood pixel comparison block around a neighborhood pixel j. The weighting can be expressed as:

$$\omega(i, j) = \frac{1}{Z(i)} e^{-\frac{\|v(N_i) - v(N_j)\|_{2,a}^2}{h^2}} \qquad (3)$$

where $\|v(N_i) - v(N_j)\|_{2,a}^2$ is the square of the difference between the gray levels of the predetermined-sized current pixel comparison block around the current pixel i and the predetermined-sized neighborhood pixel comparison block around a neighborhood pixel j, and Z(i) is the normalization constant.

Figure 3:
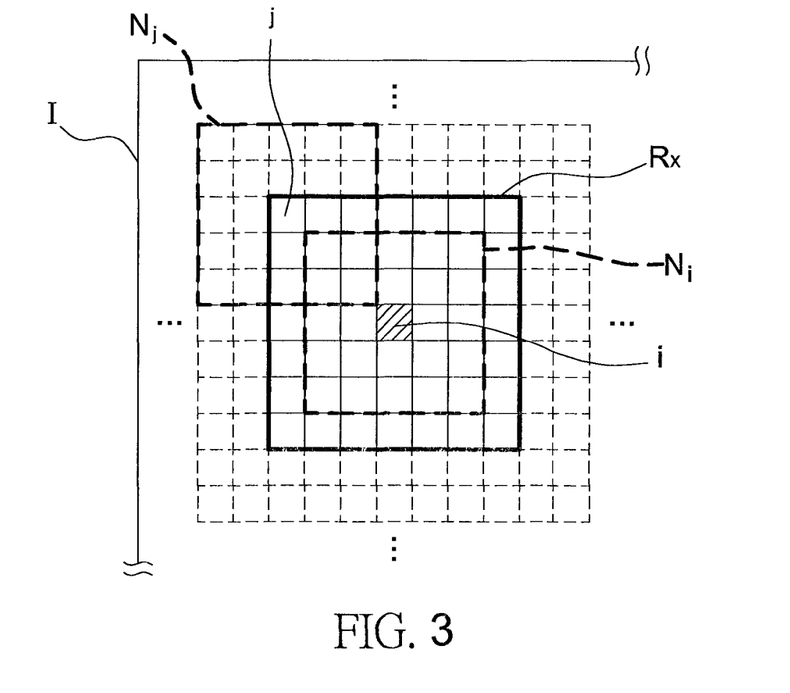
FIG. 3 is a schematic view of a conventional non-local algorithm.

Referring to FIG. 3, it illustrates the non-local algorithm that use a 7×7 search block Rx and a 5×5 comparison block (Ni, Nj), where the image I is a noisy image captured by an image sensor, i is a current pixel, Ni is the predetermined-sized (5×5) current pixel comparison block around the current pixel i, j is a neighborhood pixel of the current pixel i, Nj is the predetermined-sized neighborhood pixel comparison block around the neighborhood pixel j, and Rx is a search block. According to FIG. 3, the weighting between a current pixel i and a neighborhood pixel j depends on the sum of the squares of the twenty-five (25) differences between the pixels in the current pixel comparison block Ni and the corresponding pixels in the neighborhood pixel comparison block Nj. Therefore, forty-eight (48) weightings associated to the search block Rx can be obtained. The reconstruction value of the current pixel i is obtained by weighted averaging the gray levels of the current pixel i and neighborhood pixel j according to the weightings.

In comparison with the neighborhood filtering, the non-local algorithm can be used to obtain satisfied denoising images. However, since the noise can influence the pixels, the non-local algorithm of directly computing the gray levels for two comparison blocks can still not remove all noise in the reconstructed image. In order to improve the above non-local algorithm, the algorithm is slightly modified that the comparison block is first transformed to frequency domain and then the comparison is executed. This is because the noise commonly has dominant high-frequency components in frequency domain. Therefore, the noise can be easily filtered out in frequency-domain before the comparison is executed.

However, the above method cannot dynamically adjust related parameters for the characteristics of each pixel. This will lead to poor result of details and being very subject to shock effect or staircasting effect.

The above image reconstruction methods can be referred to the CVPR2005, entitled "A non-local algorithm for image denoising" to Antoni Buades et al. and to the ICIP2007, entitled "Image denoising based on adapted dictionary computation" to Noura Azzabou et al.

In view of the above, the present invention provides an image denoising method that can introduce a pre-denoising step and can dynamically determine a filtering strength parameter and the sizes of the current block and comparison blocks according to the characteristics of the current pixel. The present invention can conserve much more image details and enhance the denoising effect.

SUMMARY OF THE INVENTION

It is one object of the present invention to provide an image denoising method that introduces a pre-denoising step and therefore can conserve much more image details and enhance the denoising effect.

It is another object of the present invention to provide an image denoising method that can dynamically adjust the size of current search block and size of comparison blocks. In addition, the method of present invention can lower the shock effect and staircasting effect.

The present invention provides an image denoising method, comprising the steps of: sequentially selecting a pixel in an image as a current pixel, wherein the pixels around the current pixel are defined as neighborhood pixels; dynamically determining a current search block enclosing the current pixel and a strength parameter and determining a comparison block for each of the pixels in the current search block, wherein the comparison block encloses the each pixel; pre-denoising the comparison blocks for the pixels in the current search block; comparing the pre-denoised comparison blocks for the neighborhood pixels with the pre-denoised comparison block for the current pixel to obtain a similarity between each of the neighborhood pixels and the current pixel in the current search block; determining a weighting for each of the neighborhood pixels related to the current pixel according to the strength parameter, the similarity and a distance between each of neighborhood pixels and the current pixel in the current search block; and weighted averaging each of the neighborhood pixels and the current pixel in the current search block according to the weighting to obtain a reconstruction value of the current pixel.

According to the image denoising method of the present invention, wherein one embodiment of dynamically determining a current search block enclosing the current pixel and a strength parameter comprises: determining a maximal search block enclosing the current pixel and a comparison block for each of the pixels in the maximal search block, wherein the comparison block encloses the each pixel; calculating the ratios of the edge pixels for the sub-search blocks in the maximal search block; and selecting the sub-search block that has the smallest ratio of the edge pixels as the current search block and determining the strength parameter according to the ratio of the edge pixels of the current search block.

According to the image denoising method of the present invention, wherein one embodiment of calculating the ratios of the edge pixels for the sub-search blocks in the maximal search block comprises: pre-denoising the comparison blocks for the pixels in the maximal search block; calculating a sum of the absolute values of the differences between the pixels in the comparison blocks not to be pre-denoised for the pixels in the maximal search block and the corresponding pixels in the pre-denoised comparison blocks; determining the pixel to be an edge pixel when the sum of the absolute values of the differences is greater than a predetermined threshold value; and calculating the ratios of the edge pixels for the sub-search blocks in the maximal search block according to the determined result.

The present invention further provides an image denoising method, comprising the steps of: sequentially selecting a pixel in an image as a current pixel, wherein the pixels around the current pixel are defined as neighborhood pixels; determining a maximal search block enclosing the current pixel and a comparison block for each of the pixels in the maximal search block, wherein the comparison block encloses the each pixel; pre-denoising the comparison blocks for the pixels in the maximal search block; determining whether the pixels are edge pixels according to the comparison blocks not to be pre-denoised and the pre-denoised comparison blocks for the pixels in the maximal search block; calculating the ratios of the edge pixels for the sub-search blocks in the maximal search block; selecting the sub-search block that has the smallest ratio of the edge pixels as a current search block and determining a strength parameter according to the ratio of the edge pixels of the current search block; comparing the pre-denoised comparison blocks for the neighborhood pixels with the pre-denoised comparison block for the current pixel to obtain a similarity between each of the neighborhood pixels and the current pixel in the current search block; determining a weighting for each of the neighborhood pixels related to the current pixel according to the strength parameter, the similarity and a distance between each of neighborhood pixels and the current pixel in the current search block; and weighted averaging each of the neighborhood pixels and the current pixel in the current search block according to the weighting to obtain a reconstruction value of the current pixel.

According to the image denoising method of the present invention, wherein one embodiment of determining whether the pixels are edge pixels comprises: calculating a sum of the absolute values of the differences between the pixels in the comparison blocks not to be pre-denoised for the pixels in the maximal search block and the corresponding pixels in the pre-denoised comparison blocks; and determining the pixel to be an edge pixel when the sum of the absolute values of the differences is greater than a predetermined threshold value.

According to the image denoising method of the present invention, wherein the pre-denoising is performed by a low-pass filter such as a mean filter or a neighborhood filter. After being low-pass filtered, the image information in the comparison block includes only the image structure and has no noise. This can solve the problems that the pixels are subject to noise.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 4b is a flow chart of the step of determining a current search block and a strength parameter in FIG. 4a.

FIG. 8b is a flow chart of the step of determining whether a pixel is an edge pixel in FIG. 8a.

DETAILED DESCRIPTION OF THE PREFERRED EMBODIMENT

The foregoing, as well as additional objects, features and advantages of the invention will be more readily apparent from the following detailed description, which proceeds with reference to the accompanying drawings. In this invention, identical reference numerals will be used when designating substantially identical elements that are common to the figures.

Figure 4A:
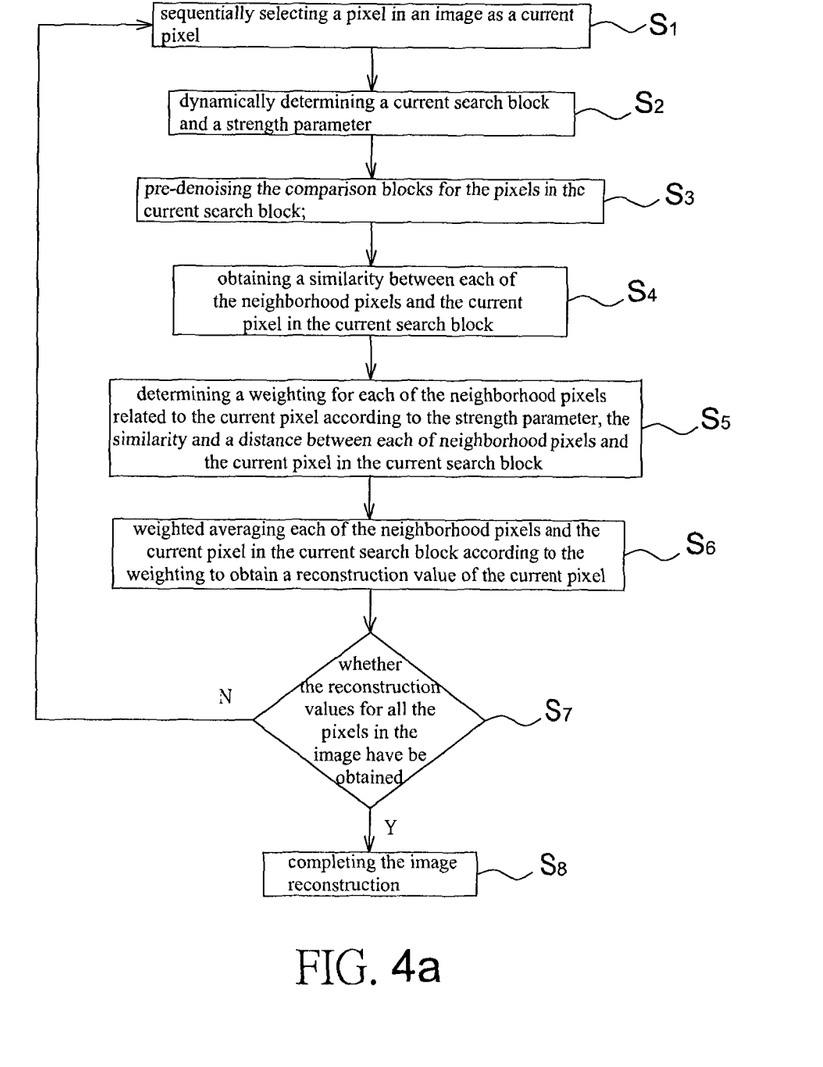
FIG. 4a is a flow chart of the image denoising method according to one embodiment of the present invention.

Referring to FIG. 4a, it illustrates the image denoising method according to one embodiment of the present invention. First, a pixel in an image is sequentially selected as a current pixel, wherein the pixels around the current pixel are defined as neighborhood pixels (step $S_1$). A current search block enclosing the current pixel and a strength parameter are then dynamically determined. In addition, a comparison block for each of the pixels in the current search block is determined, wherein the comparison block encloses the each pixel (step $S_2$). Afterward, the comparison blocks for all the pixels in the current search block are pre-denoised (step $S_3$). The pre-denoised comparison blocks for the neighborhood pixels are compared with the pre-denoised current comparison block to obtain a similarity between each of the neighborhood pixels and the current pixel in the current search block (step $S_4$). A weighting for each the neighborhood pixel related to the current pixel is determined according to the strength parameter, and a distance and the similarity between each the neighborhood pixel and the current pixel in the current search block (step $S_5$). Subsequently, a reconstruction value for the current pixel is obtained by weighted averaging each the neighborhood pixel and the current pixel in the current search block according to the weighting (step $S_6$). Finally, whether the reconstruction values for all the pixels in the image have been obtained is determined (step $S_7$). If yes, the reconstruction for the image is completed (step $S_8$). If not, the procedure will go back to step S.

Figure 4B:
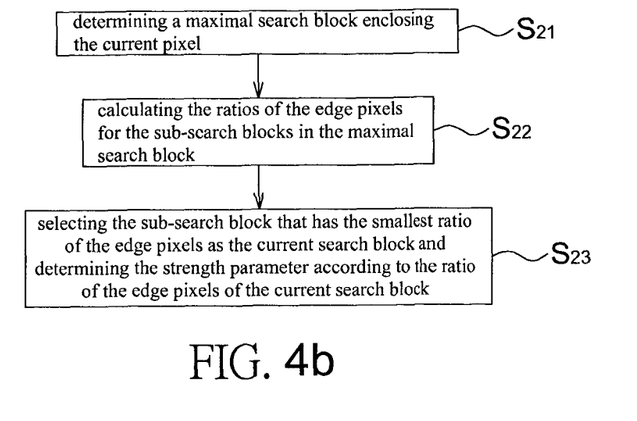

Referring to FIG. 4b, it illustrates one embodiment for the step of dynamically determining a current search block and a strength parameter in the step $S_2$. A maximal search block enclosing the current pixel is determined and a comparison block for each of the pixels in the maximal search block is determined, wherein the comparison block encloses the each pixel (step $S_{21}$). The ratios of the edge pixels for all the sub-search blocks in the maximal search block are calculated (step $S_{22}$). The sub-search block that has the smallest ratio of the edge pixels is selected as the current search block and a strength parameter is determined according to the ratio of the edge pixels of the current search block (step $S_{23}$).

Figure 4C:
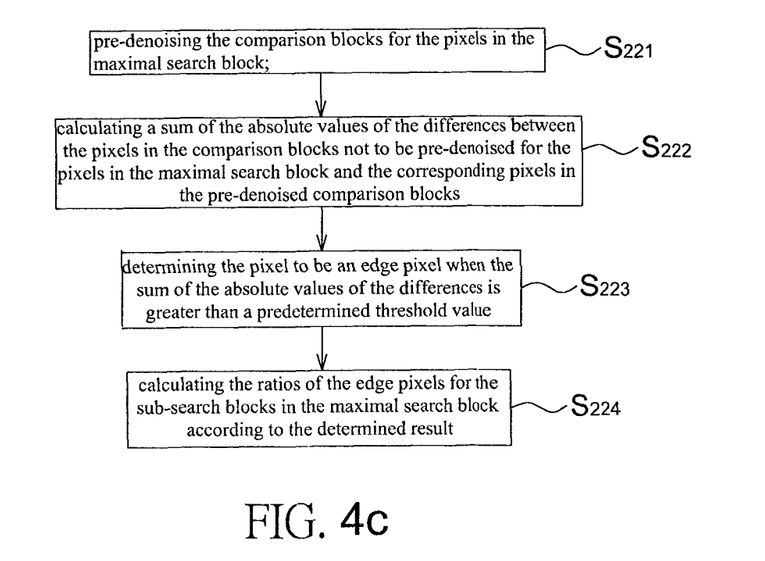
FIG. 4c is a flow chart of the step of calculating a ratio of edge pixels in FIG. 4b.

Referring to FIG. 4c, it illustrates one embodiment for the step of calculating the ratio of the edge pixels in the step $S_{22}$. The comparison blocks for all the pixels in the maximal search block are pre-denoised (step $S_{221}$). A sum of the absolute values of the differences between the pixels in the comparison blocks not to be pre-denoised for the pixels in the maximal search block and the corresponding pixels in the pre-denoised comparison blocks is calculated (step $S_{222}$). When the sum of the absolute values of the differences is greater than a predetermined threshold value, the pixel is determined to be an edge pixel (step $S_{223}$). The ratios of the edge pixels for all the sub-search blocks in the maximal search block are calculated according to the determined result (step $S_{224}$).

Afterward, the image denoising method according to the present invention will be described in detail in the following paragraphs. The image denoising method of the present invention is used to reconstruct a noisy image to be a denoised image, as shown in FIG. 1.

Figure 5:
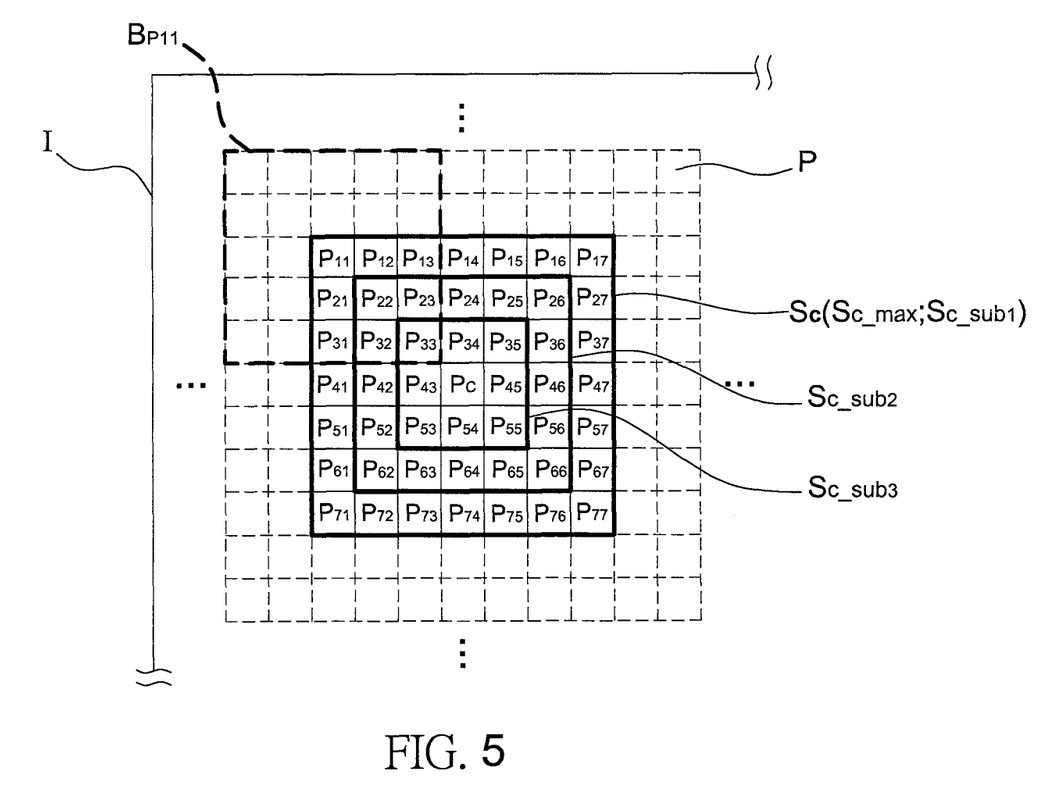
FIG. 5 is a schematic view of the sub-search blocks and neighborhood pixel comparison block according to the image denoising method of the present invention.

Referring to FIG. 5, a noisy image I includes a plurality of pixels P arranged in a matrix and each of the pixels P has a gray level. The size of the noisy image I can be determined by application. The image denoising method of the present invention is to obtain reconstructed gray levels for all the pixels in the noisy image I and then to form a denoised image according to the reconstructed gray levels.

Referring to FIGS. 4a and 5 again, the image denoising method of the present invention can first calculate the reconstructed gray level for a first pixel in one of the corners of the noisy image I and then sequentially obtain the reconstructed gray levels for the other pixels in the noisy image I. According to the present invention, a pixel is processed now is named as a current pixel Pc and the pixels around the current pixel Pc are defined as neighborhood pixels related to the current pixel Pc, which can called as $P_{11}, P_{12}, \ldots, P_{77}$ (step $S_1$).

Afterward, a current search block Sc enclosing the current pixel Pc and a strength parameter are determined (step $S_2$). In the present invention, the size of the current search block Sc is dynamically determined according to the complexity of the image around the current pixel Pc. The higher the complexity is, the smaller the size of the current search block Sc is. The lower the complexity is, the larger the size of the current search block Sc is. According to the present invention, the performance for image denoising can be enhanced by selecting different sizes of the current search blocks Sc. The strength parameter is used for the subsequent steps and configured to determine the image denoising strength. In the step $S_2$, a comparison block B for each of the pixels P in the current search block Sc is simultaneously determined, wherein the comparison block B encloses the each pixel P. For example, the comparison block $B_{p11}$ is for the pixel $P_{11}$ and has a size of 5×5. When a current search block Sc has a size of 7×7, it includes 49 pixels and the comparison blocks $B_{p11}$-$B_{p77}$ enclosing these pixels are then determined.

Referring to FIGS. 4b and 5 again, one embodiment for determining the size of the current search block Sc and the strength of the strength parameter will be described in the following paragraphs. When a current pixel Pc is selected (step $S_1$), a maximal search block Sc_max enclosing the current pixel Pc is first determined. The size of the maximal search block Sc_max is, for example, 7×7 (step $S_{21}$). The maximal search block Sc_max comprises several sub-search blocks of different sizes Sc_sub therein. These sub-search blocks can have the size of (n−2m)×(n−2m), wherein n is the side length of the square maximal search block Sc_max and n is zero or an integer. For example, in this embodiment, the sub-search block Sc_sub$_1$ has a size of 7×7, the sub-search block Sc_sub$_2$ has a size of 5×5 and the sub-search block Sc_sub$_3$ has a size of 3×3, wherein the sub-search block Sc_sub$_1$ is the largest sub-search block Sc_sub and is equal to the maximal search block Sc_max. The smallest sub-search block Sc_sub has a size of 3×3. Afterward, whether all the pixels P (49 pixels in this embodiment) in the maximal search block Sc_max are edge pixels is determined. The method of determining whether a pixel P is an edge pixel will be described in the following paragraphs. The ratios of the edge pixels for all the sub-search blocks Sc_sub$_1$, Sc_sub$_2$, Sc_sub$_3$ in the maximal search block Sc_max are simultaneously calculated. The ratio of the edge pixels for a search block is defined as that the number of the edge pixels divides by the total number of the pixels in the search block. Therefore, the ratio of the edge pixels for the sub-search blocks Sc_sub$_1$ is that the number of the edge pixels for the sub-search block Sc_sub$_1$ divides by 49. The ratio of the edge pixels for the sub-search block Sc_sub$_2$ is that the number of the edge pixels for the sub-search block Sc_sub$_2$ divides by 25. The ratio of the edge pixels for the sub-search block Sc_sub$_3$ is that the number of the edge pixels for the sub-search block Sc_sub$_3$ divides by 9 (step S$_{22}$). The sub-search block that has the smallest ratio of the edge pixels is selected as the current search block Sc and the strength of the strength parameter is determined according to the determined current search block (step S$_{23}$). For example, when the ratio of the edge pixels is higher, it means that the image around the current pixel Pc is more complex. It is therefore required to select a smaller strength parameter. In contrast, when the ratio of the edge pixels is lower, it means that the change of the image around the current pixel Pc is more uniform. A larger strength parameter is selected. However, the present invention is not limited to the above description. The sprit of the present invention is to determine the size of the current search block Sc and the strength of the strength parameter according to the complexity of the image around the current pixel Pc. Therefore, other methods can also be used to obtain the complexity of the image around the current pixel Pc.

Figure 6:
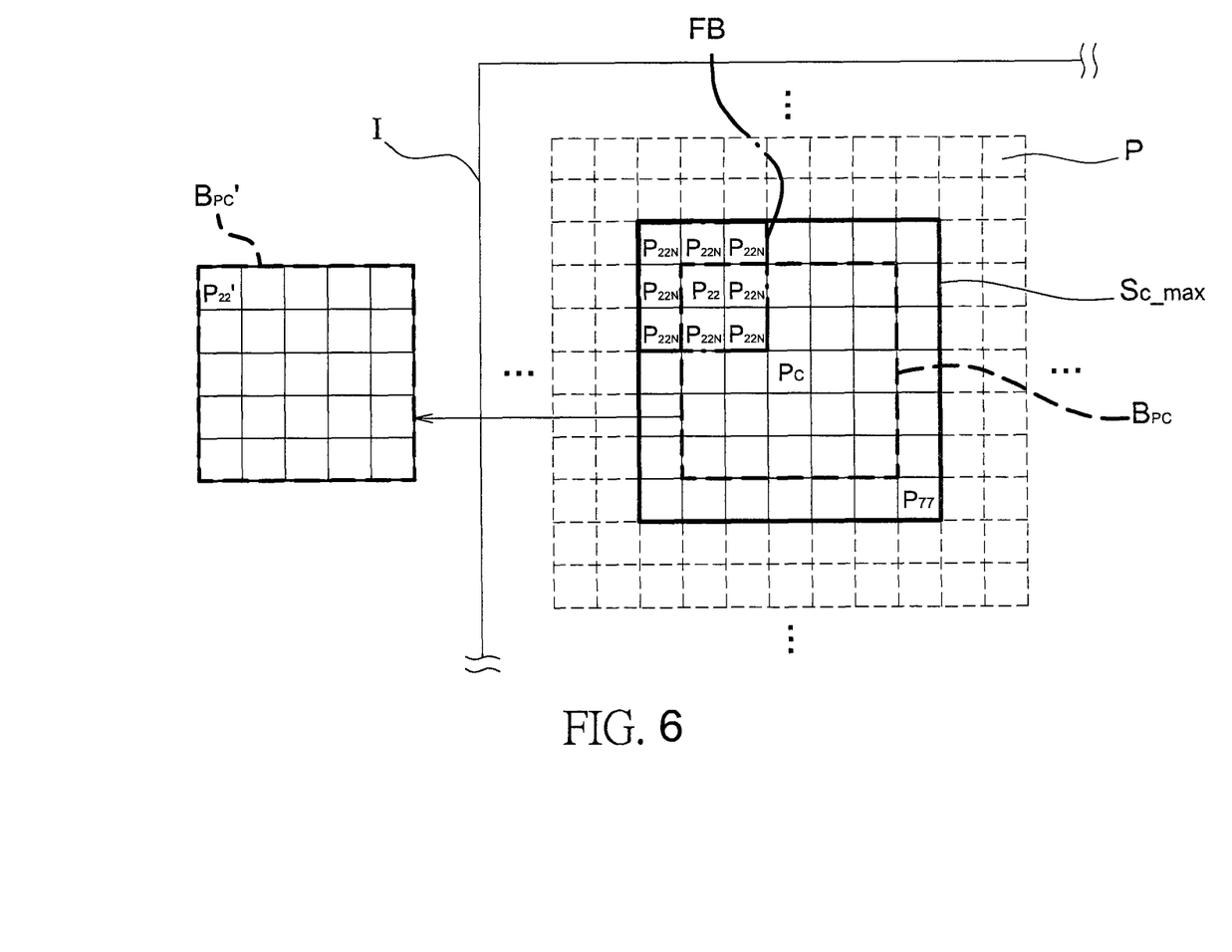
FIG. 6 is a schematic view illustrating that determines whether a pixel is an edge pixel according to the image denoising method of the present invention.

Referring to FIGS. 4c to 6, one embodiment for calculating the ratios of the edge pixels of the sub-search blocks Sc_sub will be described in the following paragraphs. The pixels P in the maximal search block Sc_max are sequentially determine whether the pixel is an edge pixel before the ratios of the edge pixels are calculated. When the maximal search block Sc_max is determined (step S$_{21}$), a comparison block Bpc is determined for each of the pixels P in the maximal search block Sc_max, wherein the comparison block B encloses the each pixel. For example, the current pixel Pc determines a comparison block Bpc. In this embodiment, the maximal search block Sc_max has a size of 7×7 and the comparison block B has a size of 5×5. First, the comparison blocks B for all the pixels P in the maximal search block Sc_max are pre-denoised. For example, a comparison block B, such as the current comparison block Bpc for the current pixel Pc can be pre-denoised by a mean filter or a neighborhood filter. As shown in FIG. 6, all the pixels in the comparison block Bpc are subjected to a grey level average or a weighting average through a filtering block FB of 3×3 size. For example, a pixel P$_{22}$ is averaged with its eight neighborhood pixels P$_{22N}$ to form a pixel P$_{22}$'. When the pixels P not to be pre-denoised in the current comparison block Bpc is subjected to the above average process, a pre-denoised current comparison block Bpc' is formed (step S$_{221}$). Afterward, the absolute value of the difference between the grey level of each of the pixels in the current comparison block Bpc and the grey level of the corresponding pixel in the pre-denoised current comparison block Bpc' is calculated (step S$_{222}$). These absolute values are then added up. For example, in this embodiment, the current comparison block Bpc comprises 25 pixels. Therefore, twenty-five absolute values of the differences between the grey levels can be obtained. When the sum of the absolute values of the differences between the grey levels is greater than a predetermined threshold value, it means that the image in the current comparison block Bpc is more complex. Therefore, the current pixel Pc is defined as an edge pixel (step S$_{223}$). Afterward, all the pixels in the maximal search block Sc_max are similarly processed in order to determine whether the pixel is an edge pixel. After all the edge pixels have been identified, the ratios of the edge pixels for all the sub-search blocks in the maximal search block Sc_max can be calculated (step S$_{224}$). It should be understood that the method of identifying an edge pixel is not limited to the above description. Other methods that can determine the complexity of a pixel area can also be used in the step S$_{22}$. For example, the square of the difference between the grey level of each of the pixels not to be pre-denoised in the comparison block and the grey level of the corresponding pixel in the pre-denoised comparison block is calculated. The sum of these squares is then compared with a threshold value to determine whether a pixel is an edge pixel. In addition, it will be noted that the comparison blocks for the pixels in the current search block can also be dynamically determined according to the ratio of the edge pixels.

Figure 7:
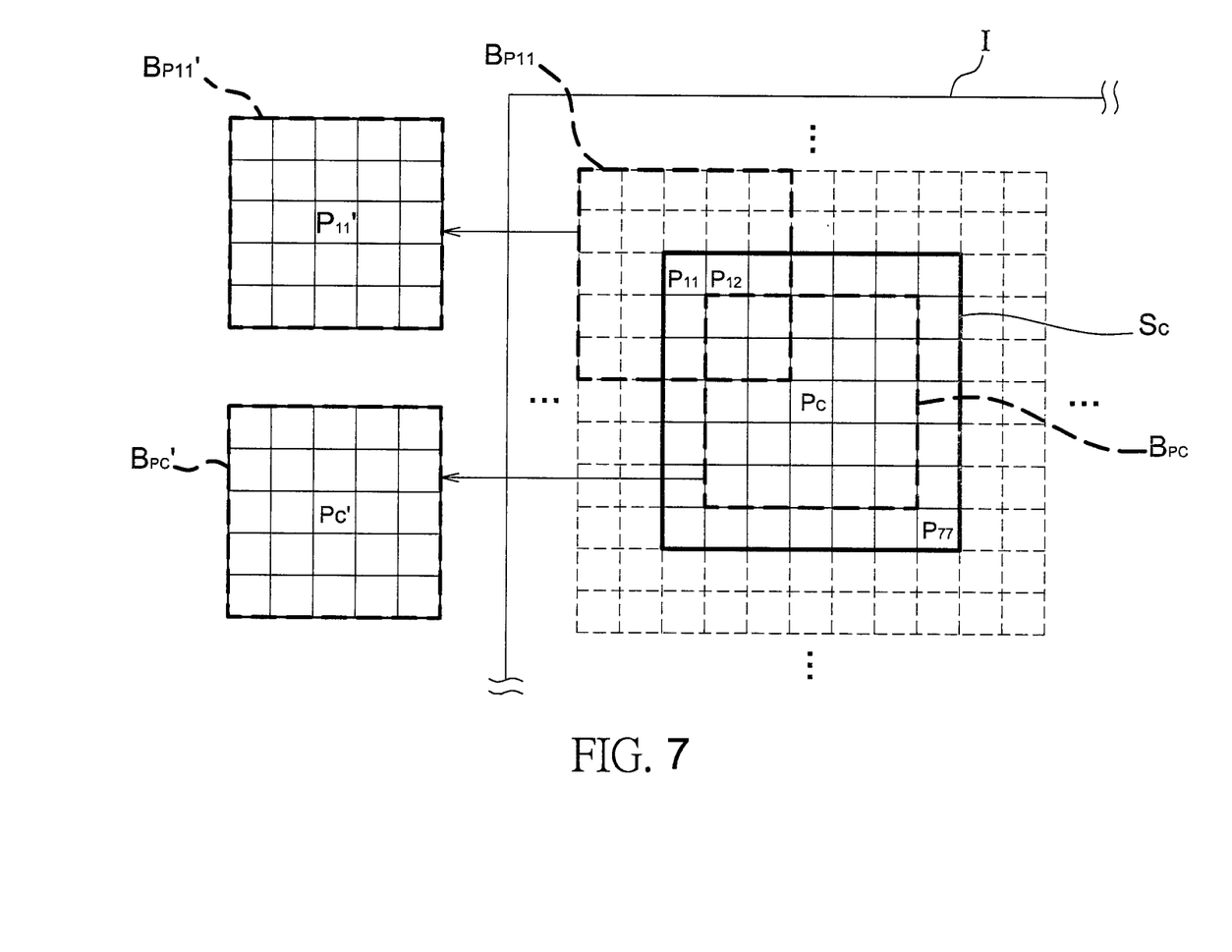
FIG. 7 is a schematic view illustrating that determines a weighting of a neighborhood pixel related to the current pixel according to the image denoising method of the present invention.

Referring to the FIGS. 4a and 7, when the step S$_2$ is completed, a current search block Sc and a strength parameter can be dynamically determined according to the complexity of the image around the current pixel Pc. As shown in FIG. 7, the current search block Sc has a size of 7×7. Therefore, the current search block Sc comprises 49 pixels and corresponding comparison blocks thereof. Afterward, the search blocks B for all the pixels in the current search block Sc are subjected to the pre-denoising. For example, the pre-denoising can be performed by the mean filter or the neighborhood filter (step S$_3$). The embodiment has been described above. For example, the comparison block B$_{p11}$ for a neighborhood pixel P$_{11}$ is subjected to a pre-denoising to form a pre-denoised comparison block B$_{p11}$', and the current comparison block Bpc for the current pixel Pc is subjected to the pre-denoising to form a pre-denoised current comparison block Bpc'. It should be understood that the comparison blocks for all the pixels in the current search block Sc will form corresponding pre-denoised comparison blocks after being pre-denoised. In addition, when the comparison blocks for all the pixels in the maximal search block Sc_max have been pre-denoised in the step S$_{22}$, the numeric values of the pre-denoised comparison blocks can be stored in a register or a memory for use in the subsequent step S$_3$.

Afterward, the pre-denoised comparison blocks for all the neighborhood pixels in the current search block Sc are compared with the pre-denoised current comparison block to obtain a similarity between each of the neighborhood pixels and the current pixel Pc (step S$_4$). Therefore, for the 7×7 current search block, it is required to make a total of 48 comparisons. As known, the similarity between the pre-denoised current comparison block and the pre-denoised current comparison block will be 100%. For example, in one embodiment, a sum of the squares of the differences between the pixels in the pre-denoised comparison block for the pixel B$_{p11}$', and the corresponding pixels in the pre-denoised current comparison block Bpc' is obtained. When the sum of the squares of the differences is great, it means that the similarity between the pixels $P_{11}$ and Pc is small. In contrast, when the sum of the squares of the differences is small, it means that the similarity between the pixels $P_{11}$ and Pc is great. After the comparison between the pre-denoised comparisons $Bp11'$ and $Bpc'$ is finished, the pre-denoised comparison blocks $B_{p12'}$-$B_{p77'}$ for the other neighborhood pixels $P_{12}$-$P_{77}$ in the current search block Sc are compared with the pre-denoised current comparison block $Bpc'$. However, the method of obtaining the similarities is not limited to the above description. For example, a sum of the absolute values of the differences between the pixels in the pre-denoised comparison block for the pixel $B_{p11'}$ and the corresponding pixels in the pre-denoised current comparison block $Bpc'$ can also be made to obtain the similarity.

Therefore, a weighting for each of the neighborhood pixels $P_{11}$-$P_{77}$ related to the current pixel Pc is determined according to the strength parameter, and a distance and the similarity between each of the neighborhood pixels $P_{11}$-$P_{77}$ and the current pixel Pc in the current search block (step $S_6$). When a neighborhood pixel is farther from the current pixel Pc, the weighting for the neighborhood pixel is lowered. In contrast, when a neighborhood pixel is closer to the current pixel Pc, the weighting for the neighborhood pixel is increased. When the similarity between a neighborhood pixel and the current pixel Pc is lower, the weighting for the neighborhood pixel is lowered. In contrast, when the similarity between a neighborhood pixel and the current pixel Pc is higher, the weighting for the neighborhood pixel is increased. When a weighting rate for each of the neighborhood pixels $P_{11}$-$P_{77}$ in the current search block Sc is determined according to the distance and similarity between each the neighborhood pixel and the current pixel Pc, a weighting for each of the neighborhood pixels $P_{11}$-$P_{77}$ related to the current pixel Pc is determined according to the strength parameter. When the image in the current search block Sc is complex, a low strength parameter is selected so as to lower the denoising strength. If the change of the image in the current search block Sc is uniform, a high strength parameter is selected to increase the denoising strength. The strength parameter adjusts the weighting rate according to the complexity of the image in the current search block Sc. Therefore, the strength parameter can be a mathematical function (ratio, power, log function or other functions) or a numeric value. For example, the strength parameter can be that the weighting rate multiplies by a ratio, the weighting rate to the power, the logarithm of the weighting rate or that the weighting rate adds a certain value.

When a weighting for each of the neighborhood pixels $P_{11}$-$P_{77}$ related to the current pixel Pc in the current search block Sc is obtained, the current pixel Pc and each of the neighborhood pixels $P_{11}$-$P_{77}$ is weighted averaged, e.g. by formula (2) to obtain a reconstruction value the current pixel Pc (step $S_6$) according to the weighting.

Afterward, whether the reconstruction values for all the pixels in the noisy image I have been obtained is determined (step $S_7$). When the reconstruction values for all the pixels have been obtained, the noisy image I is reconstructed and a denoised image is generated. If the reconstruction values for the pixels have not been all obtained, the procedure will go back to step $S_1$. A next pixel P in the image I will be reconstructed.

Figure 8A:
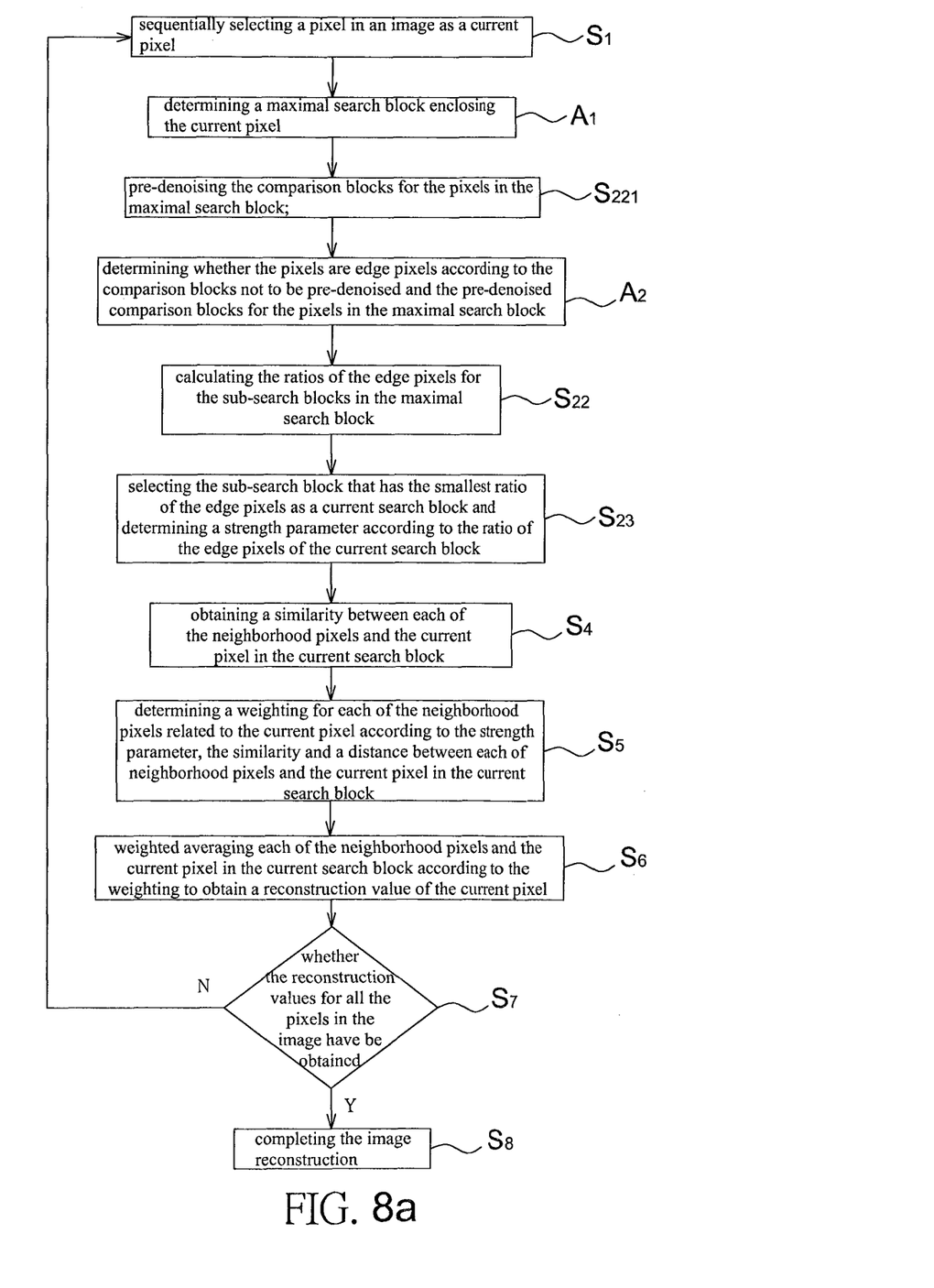
FIG. 8a is a flow chart of the image denoising method according to another embodiment of the present invention.

Referring to FIG. 8a, it illustrates the image denoising method according to another embodiment of the present invention. First, a pixel in an image is sequentially selected as a current pixel, wherein the pixels around the current pixel are defined as neighborhood pixels (step $S_1$). A maximal search block enclosing the current pixel is determined and a comparison block for each of the pixels in the maximal search block is determined, wherein the comparison block encloses the each pixel (step $A_1$). Afterward, the comparison blocks for all the pixels in the maximal search block are pre-denoised (step $S_{221}$). The pixels in the maximal search block are determined whether are edge pixels according to the comparison blocks not to be pre-denoised and the pre-denoised comparison blocks for the pixels in the maximal search block (step $A_2$). The ratio of the edge pixels for all the sub-search blocks in the maximal search block are calculated (step $S_{22}$). The sub-search block that has the smallest ratio of the edge pixels is selected as the current search block and a strength parameter is determined according to the ratio of the edge pixels of the current search block (step $S_{23}$). The pre-denoised comparison blocks for the neighborhood pixels are compared with the pre-denoised current comparison block to obtain a similarity between each of the neighborhood pixels and the current pixel in the current search block (step $S_4$). A weighting for each the neighborhood pixel related to the current pixel is determined according to the strength parameter, and a distance and the similarity between each the neighborhood pixel and the current pixel in the current search block (step $S_5$). Subsequently, a reconstruction value for the current pixel is obtained by weighted averaging each the neighborhood pixel and the current pixel in the current search block according to the weighting (step $S_6$). Finally, whether the reconstruction values for all the pixels in the image have been obtained is determined (step $S_7$). If yes, the reconstruction for the image is completed (step $S_8$). If not, the procedure will go back to step $S_1$. In this embodiment, identical reference numerals have been used when designating identical steps that are common to FIGS. 4a-4c. In addition, the step $A_1$ in FIG. 8a is similar to the step $S_{21}$ in FIG. 4b and the step $A_2$ is similar to the steps $A_{22}$ and $A_{23}$. This embodiment is substantially the same as the embodiment disclosed in FIGS. 4a-4c and the difference between them is only in the sequence of the steps. Thus, any further illustrations of this embodiment are omitted herein.

Figure 8B:
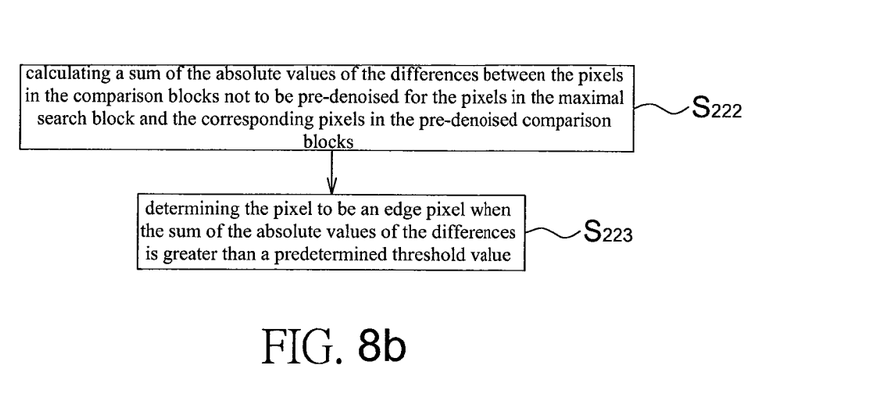

In addition, referring to FIGS. 8a and 8b, the step $A_2$ of determining whether a pixel is an edge pixel comprises the following steps. A sum of the absolute values of the differences between the pixels in the comparison block not to be pre-denoised for the pixels in the maximal search block and the corresponding pixels in the pre-denoised comparison block is calculated (step $S_{222}$). When the sum of the absolute values of the differences is greater than a predetermined threshold value, the pixel is determined to be an edge pixel (step $S_{223}$).

It will be noted that although the above blocks, including current search block, maximal search block, sub-search block, search block and comparison block, are square disclosed in the embodiments, they can have any shape, such as rectangle, rhombus, circle or ellipse.

As described above, since the pixels are subject to the noise, the conventional non-local algorithm can still not get rid of the influence of noise in the course of comparison between two comparison blocks. This will decrease the performance of removing noise from an image. The present invention provides an image denoising method that introduces a pre-denoising step and can dynamically determine a filtering strength parameter and the sizes of the current block and comparison blocks according to the characteristics of the current pixel. The present invention can conserve much more image details and enhance the denoising effect.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An image denoising method, comprising the steps of:
sequentially selecting a pixel in an image as a current pixel, wherein pixels around the current pixel are defined as neighborhood pixels;
dynamically determining a current search block enclosing the current pixel and a strength parameter, and determining a comparison block for each of the pixels in the current search block, wherein the comparison block encloses the each pixel;
pre-denoising the comparison blocks for the pixels in the current search block;
comparing the pre-denoised comparison blocks for the neighborhood pixels with the pre-denoised comparison block for the current pixel to obtain a similarity between each of the neighborhood pixels and the current pixel in the current search block;
determining a weighting for each of the neighborhood pixels related to the current pixel according to the strength parameter, the similarity and a distance between the each neighborhood pixel and the current pixel in the current search block; and
weighted averaging each of the neighborhood pixels and the current pixel in the current search block according to the weighting to obtain a reconstruction value of the current pixel,
wherein the step of dynamically determining comprises:
determining a maximal search block enclosing the current pixel and a comparison block for each of the pixels in the maximal search block, wherein the comparison block encloses the each pixel;
calculating the ratios of the edge pixels for the sub-search blocks in the maximal search block; and
selecting the sub-search block that has the smallest ratio of the edge pixels as the current search block and determining the strength parameter according to the ratio of the edge pixels of the current search block.

2. The image denoising method as claimed in claim 1, wherein the step of calculating the ratios of the edge pixels for the sub-search blocks in the maximal search block comprises:
pre-denoising the comparison blocks for the pixels in the maximal search block;
calculating a sum of the absolute values of the differences between the pixels in the comparison blocks not to be pre-denoised for the pixels in the maximal search block and the corresponding pixels in the pre-denoised comparison blocks;
determining the pixel to be an edge pixel when the sum of the absolute values of the differences is greater than a predetermined threshold value; and
calculating the ratios of the edge pixels for the sub-search blocks in the maximal search block according to the determined result.

3. The image denoising method as claimed in claim 2, wherein the pre-denoising is performed by a mean filter or a neighborhood filter.

4. The image denoising method as claimed in claim 2, wherein the sub-search blocks have sizes of $(n-2m)\times(n-2m)$, n is the side length of the maximal search block and n is zero or an integer.

5. The image denoising method as claimed in claim 4, wherein the smallest sub-search block has a size of $3\times3$ and the largest sub-search block is equal to the maximal search block.

6. The image denoising method as claimed in claim 1, wherein the largest sub-search block has a size of $7\times7$.

7. The image denoising method as claimed in claim 1, wherein when the ratio of edge pixels is higher, the strength parameter is smaller, and when the ratio of edge pixels is lower, the strength parameter is larger.

8. The image denoising method as claimed in claim 1, wherein the current search block and comparison block have a shape of square, rectangle, rhombus, circle or ellipse.

9. The image denoising method as claimed in claim 1, further comprising:
determining whether reconstruction values for all the pixels in the image have been obtained.

10. The image denoising method as claimed in claim 1, wherein the similarity is a sum of the squared differences between the pixels in the pre-denoised comparison block for the neighborhood pixel and the corresponding pixels in the pre-denoised comparison block for the current pixel.

* * * * *